(12) United States Patent
Seufert et al.

(10) Patent No.: US 12,181,002 B2
(45) Date of Patent: Dec. 31, 2024

(54) COMPLEX RING ELEMENT HAVING ADDITIVELY APPLIED CONNECTING ELEMENT

(71) Applicant: Siemens Aktiengesellschaft, Munich (DE)

(72) Inventors: Reiner Seufert, Salz (DE); Rolf Vollmer, Gersfeld (DE)

(73) Assignee: Siemens Aktiengesellschaft, Munich (DE)

( * ) Notice: Subject to any disclaimer, the term of this patent is extended or adjusted under 35 U.S.C. 154(b) by 577 days.

(21) Appl. No.: 17/431,652

(22) PCT Filed: Dec. 19, 2019

(86) PCT No.: PCT/EP2019/086252
§ 371 (c)(1),
(2) Date: Aug. 17, 2021

(87) PCT Pub. No.: WO2020/173597
PCT Pub. Date: Sep. 3, 2020

(65) Prior Publication Data
US 2022/0136563 A1 May 5, 2022

(30) Foreign Application Priority Data
Feb. 25, 2019 (EP) .................... 19159029

(51) Int. Cl.
*F16D 1/027* (2006.01)
*H02K 7/00* (2006.01)
(52) U.S. Cl.
CPC ............ *F16D 1/027* (2013.01); *H02K 7/003* (2013.01)
(58) Field of Classification Search
CPC . F16D 1/02; F16D 1/027; F16D 1/108; F16D 1/116; F16D 2001/102;
(Continued)

(56) References Cited

U.S. PATENT DOCUMENTS 1,983,007 A * 12/1934 Simons ..................... F16D 3/54
464/154
2,646,995 A * 7/1953 Thompson ........... B23K 9/0358
228/246
(Continued)

FOREIGN PATENT DOCUMENTS

CN 101398033 A 4/2009
CN 104040083 A 9/2014
(Continued)

OTHER PUBLICATIONS

Translated Description of DE 102015224947. Striedelmeyer Thomas. A Method of Manufacturing a Turbine Wheel Assembly Comprising a Turbine Wheel and a Shaft. Jun. 14, 2017.*
(Continued)

*Primary Examiner* — Amber R Anderson
*Assistant Examiner* — Kevin J Baynes
(74) *Attorney, Agent, or Firm* — Henry M. Feiereisen LLC

(57) ABSTRACT

A complex ring element includes first and second rings arranged such that their axes lie on a shared axis and disposed adjacent to one another when viewed in the direction of the shared axis, with one of the first and second rings representing a shaft of a rotor or being connected to a shaft of the rotor. A connecting element made of metal interconnects the first and second rings of metal such that outer peripheral surfaces of the first and second rings are partially overlapped when viewed in the direction of the shared axis. The connecting element is configured to extend circumferentially as viewed in the peripheral direction about the shared axis and is produced by an additive application method.

5 Claims, 2 Drawing Sheets

(58) Field of Classification Search
CPC ....... F16D 2001/103; F16D 2200/0021; F16D 2250/0061; F16B 2200/97; F16B 7/0426; Y10T 403/21; Y10T 403/213; Y10T 403/217; Y10T 403/559; Y10T 403/57; Y10T 403/5733; Y10T 403/7026; H02K 7/003

See application file for complete search history.

(56) References Cited

U.S. PATENT DOCUMENTS

| | | | | |
|---|---|---|---|---|
| 4,614,453 A | * | 9/1986 | Tsuno | F16B 4/00 403/30 |
| 4,892,436 A | * | 1/1990 | Mizuno | F16B 4/004 416/241 B |
| 6,007,301 A | * | 12/1999 | Noda | F01D 5/28 416/213 R |
| 8,591,205 B2 | * | 11/2013 | Brown | E21B 43/128 417/423.6 |
| 9,869,182 B2 | * | 1/2018 | Albuzat | F01D 5/026 |
| 2006/0121994 A1 | | 6/2006 | Douglass | |
| 2010/0050633 A1 | * | 3/2010 | Jennes | B23K 28/00 60/605.1 |
| 2014/0314473 A1 | | 10/2014 | Stephan | |
| 2015/0078905 A1 | | 3/2015 | Albuzat et al. | |

FOREIGN PATENT DOCUMENTS

| | | |
|---|---|---|
| CN | 204127089 U | 1/2015 |
| CN | 104395027 A | 3/2015 |
| DE | 601 25 283 T2 | 5/2007 |
| DE | 102016013493 A1 | 5/2017 |
| DE | 10 2016 224 947 A1 | 6/2017 |
| EP | 2 415 908 A1 | 2/2012 |
| JP | 2009228774 A | 10/2009 |

OTHER PUBLICATIONS

Translated Description of DE 60125283. Davi Claude. Method for Producing a Sleeve for Connecting Two Corrugated Shafts and Connecting Sleeve Produced Therewith. May 31, 2007.*

Translated Description of CN 204127089. Zhang Jie. Connecting Shaft. Jan. 28, 2015.*

PCT International Search Report and Written Opinion of International Searching Authority mailed Dec. 3, 2020 corresponding to PCT International Application No. PCT/EP2019/086252 filed Dec. 19, 2019.

* cited by examiner

COMPLEX RING ELEMENT HAVING ADDITIVELY APPLIED CONNECTING ELEMENT

CROSS-REFERENCES TO RELATED APPLICATIONS

This application is the U.S. National Stage of International Application No. PCT/EP2019/086252, filed Dec. 19, 2019, which designated the United States and has been published as International Publication No. WO 2020/173597 A1 and which claims the priority of European Patent Application, Ser. No. 19/159,029.8, filed Feb. 25, 2019, pursuant to 35 U.S.C. 119 (a)-(d).

BACKGROUND OF THE INVENTION

The present invention is based on a complex ring element,
wherein the complex ring element has a first and a second ring with a respective axis,
wherein the first and the second ring are arranged such that their axes lie on a shared axis and the first and the second ring are adjacent to one another when viewed in the direction of the shared axis,
wherein the complex ring element has a connecting element, by way of which the first and the second ring are interconnected,
wherein the connecting element consists of metal.

In many cases, two rings should be interconnected via a connecting element, in order for the two rings to be axially, radially and tangentially fixed in relation to one another. For example, a rotor of an electric machine may have a complex ring element of this kind. A complex ring element of this kind may be advantageous during operation of the electric machine.

In the prior art, it is known to arrange the two rings concentrically and to shrink-fit the one ring onto the other. Furthermore, it is known to arrange the two rings in such a way that they are adjacent to one another when viewed in the direction of the shared axis and the two rings are interconnected, for example, via a plurality of threaded bolts, wherein the threaded bolts run axially and are arranged distributed in a circular manner about the shared axis with a suitable distance. It is also known to use a combination of non-positive and positive fit or to adhesively bond, to weld or to solder the two rings to one another. Where necessary, in this context a possible ring made of ceramic has been metalized in advance, i.e. provided with a metal layer.

The patent specification DE 10 2015 224 947 A1 relates to a method for manufacturing a turbine wheel arrangement comprising a turbine wheel and a shaft, wherein the shaft is generated on the turbine wheel at least partially by means of an additive manufacturing method.

The object of the present invention consists in creating a complex ring element, which is simple to produce and in which the two rings of the ring element are interconnected in a stable and reliable manner.

SUMMARY OF THE INVENTION

The object is achieved by a complex ring element as set forth hereinafter. Advantageous embodiments of the complex ring element are the subject matter of the dependent claims. A preferred use of the complex ring element is as a component of a rotor.

According to the invention, a complex ring element of the type mentioned in the introduction is embodied such that the connecting element in each case partially overlaps the first and the second ring on their respective outer peripheral surfaces when viewed in the direction of the shared axis,
the connecting element is circumferential when viewed in the peripheral direction about the shared axis and
the connecting element is manufactured by means of an additive application method.

The connecting element is preferably manufactured by means of a cold gas spraying. In this case, the connecting element can be manufactured in a particularly efficient manner.

As a general rule, the first ring consists of metal, in particular steel. Particularly in this case—but not necessarily limited to this case—the connecting element may be connected to the first ring with a material fit. This type of the connection represents the most stable form of the connection. It should therefore be targeted, where possible.

Often, the second ring consists of ceramic. Particularly in this case—but not necessarily—the connecting element is often connected to the second ring with a positive and/or non-positive fit.

Preferably, on its peripheral surface, the first ring has a first contour which uses a resistance to counteract a twisting of the connecting element about the shared axis in relation to the first ring. As a result, a particularly high torque can be transferred between the first ring and the connecting element.

Preferably, on its peripheral surface, the second ring has a second contour which uses a resistance to counteract a twisting of the connecting element about the shared axis in relation to the second ring. As a result, a particularly high torque can be transferred between the second ring and the connecting element.

The complex ring element may in particular be used as a component of a rotor of an electric machine.

BRIEF DESCRIPTION OF THE DRAWING

The above-described properties, features and advantages of this invention as well as the manner in which they are achieved will become clearer and more comprehensible in conjunction with the following description of the exemplary embodiments, which are explained in more detail in conjunction with the drawings, in which, in a schematic representation.

DETAILED DESCRIPTION OF PREFERRED EMBODIMENTS

Figure 1:
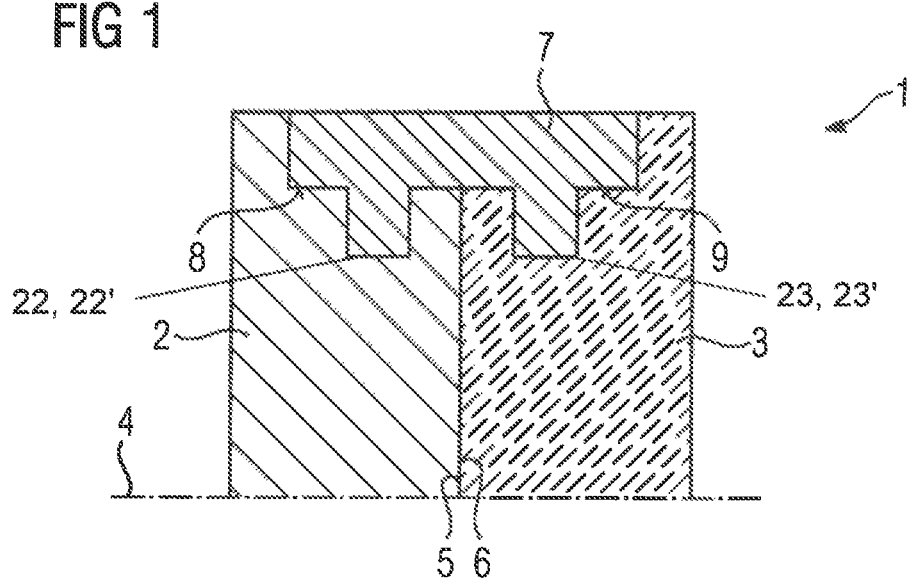
FIG. 1 shows a partial section through a complex ring element.

In accordance with FIG. 1, a complex ring element 1 has a first ring 2 and a second ring 3. The two rings 2, 3 each have an axis. According to the representation in FIG. 1, the two rings 2, 3 are arranged such that their axes lie in a shared axis 4.

Insofar as reference is made hereinbelow to "axial", "radial" and "tangential", these always relate to the shared axis 4. "Axial" is a direction parallel to the shared axis 4. "Radial" is a direction orthogonal to the axial direction directly toward the shared axis 4 or away from it. "Tangential" is a direction which runs both orthogonally to the axial direction and orthogonally to the radial direction. "Tangential" is therefore a direction which is directed around the shared axis 4 in a circular manner, with a constant axial position at a constant radial distance from the shared axis 4.

When viewed in the axial direction, the two rings 2, 3 are adjacent to one another. Boundary surfaces 5, 6 of the two rings 2, 3, at which the two rings 2, 3 are immediately adjacent to one another, preferably run orthogonally to the shared axis 4.

The complex ring element 1 furthermore has a connecting element 7. The two rings 2, 3 are interconnected by the connecting element 7.

According to the representation in FIG. 1, the connecting element 7 consists of metal. In particular, it may consist of steel.

According to the representation in FIG. 1, the connecting element 7 overlaps the two rings 2, 3 on their outer peripheral surfaces 8, 9. When viewed in the direction of the shared axis 4, the overlapping is partial in each case. In these regions, the connecting element 7 is therefore applied to the two rings 2, 3 radially on the outside. The connecting element 7 is circumferential in the peripheral direction about the shared axis 4. It is therefore itself likewise embodied in a ring-like manner. The two rings 2, 3 each have circumferential recesses 22', 23' on their outer peripheral surfaces 8, 9. The connecting element 7 has complementary circumferential projections 22, 23 on its inner circumferential surface engaging in the respective circumferential recesses 22', 23'.

Figure 2:
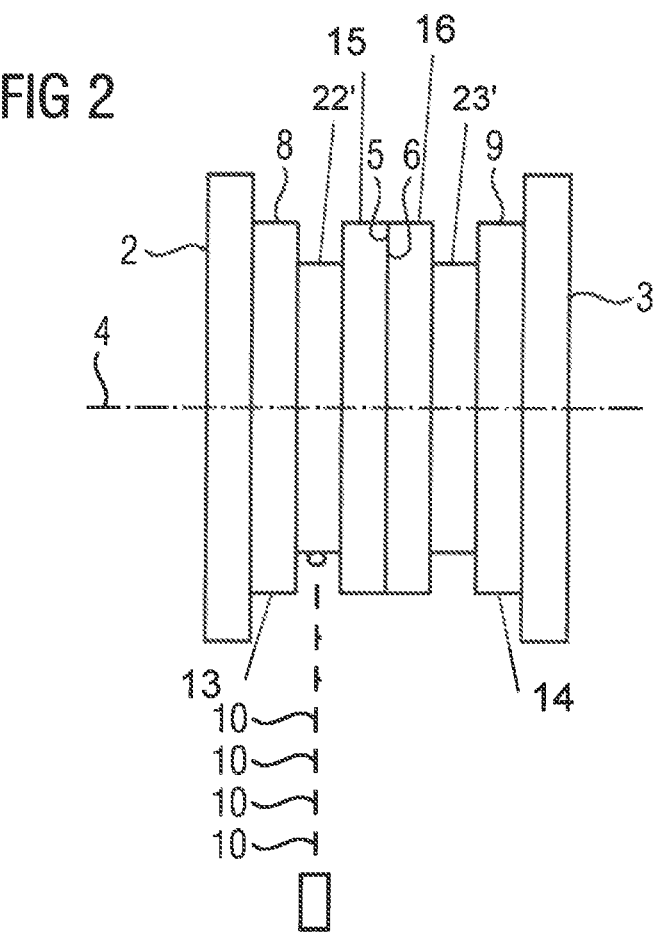
FIG. 2 shows a first and a second ring at the start of the manufacturing of a connecting element.

The connecting element 7 is manufactured by means of an additive application method. Additive application methods are methods in which the material, of which the connecting element 7 consists, according to the representation in FIG. 2, is applied to the first and the second ring 2, 3 by means of a gas stream in the form of small doses 10 (singular: dose). Due to the small doses 10 striking the rings 2, 3, a connection of the connecting element 7 to the two rings 2, 3 is formed with a material fit or a positive and/or non-positive fit. The kind of connection that is formed depends upon the materials of which the connecting element 7 and the two rings 2, 3 consist. Subsequent layers of the connecting element 7 always connect to the already-applied layers of the connecting element 7 with a material fit. The frictional connection is in particular caused by the connecting element 7 being thermally heated during application to the peripheral surfaces 8, 9 of the two rings 2, 3, cooling down again at a later point in time and shrinking in the process. The aforedescribed engagement between recesses 22', 23' in the rings 2, 3 and the projections 22, 23 in the connecting element 7 strengthens the material fit or positive and/or non-positive fit between the connecting element 7 and each of the two rings 2, 3.

In many cases, the first ring 2 consists of metal, in particular steel. However, the first ring 2 may also consist of a different metal, for example aluminum or titanium. It may also consist of a different material. In the case of a metal being used as material for the first ring 2, a material-fit connection is formed as a general rule. In this case, following manufacture of the connecting element 7, the connecting element 7 is therefore connected to the first ring 2 with a material fit. The material-fit connection represents the most stable form of the connection. It should therefore be targeted, where possible. In individual cases, however, it is also possible for the connection of the connecting element 7 to the first ring 2 to have a positive and/or non-positive fit.

In many instances, the second ring 3 continues to consist of ceramic. In the case of ceramic being used as material for the second ring 3, but also in some other cases, a positive and/or non-positive connection is formed. In this case, following manufacture of the connecting element 7, the connecting element 7 is therefore connected to the second ring 3 with a positive and/or non-positive fit.

The gas stream, by means of which the doses 10 are applied, has a relatively high temperature. It is possible for the temperature of the gas stream to be so high that the material, of which the connecting element 7 consists, melts or fuses. In this case, the term used is "thermal spraying", and the doses 10 are often small droplets. Preferably, however, the temperature of the gas stream is lower, so that the material, of which the connecting element 7 consists, does not melt or fuse. In this case, the term used is "cold gas spraying", and the doses 10 are small granules.

Figure 3:
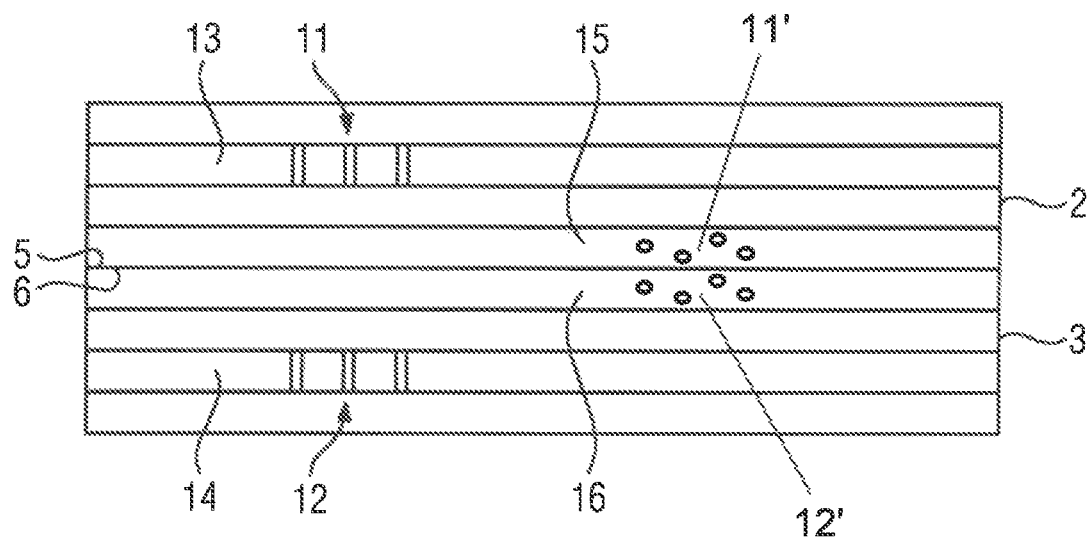
FIG. 3 shows peripheral surfaces of a first and a second ring in a rolled-out representation.

Particularly in the case where the connecting element 7 only forms a positive and/or non-positive connection with the respective ring 2, 3, according to the representation in FIG. 3, the respective ring 2, 3, on its peripheral surface 8, 9, preferably has a corresponding contour 11, 12 which uses a resistance to counteract a twisting of the connecting element 7 about the shared axis 4 in relation to the respective ring 2, 3. The respective contour 11, 12, as shown in FIG. 3 in regions 13, 14, for example, that overlap with the connecting element 7, may have a structure similar to a toothed wheel. However, other embodiments of the contours 11, 12 are also possible. For example, the contours 11', 12', as shown in FIG. 3 in other regions 15, 16, that overlap with the connecting element 7, may be embodied as small local elevations and/or depressions. Other embodiments are also possible. Only ring-like structures which are circumferential tangentially about the shared axis 4 are not permitted.

Figure 4:
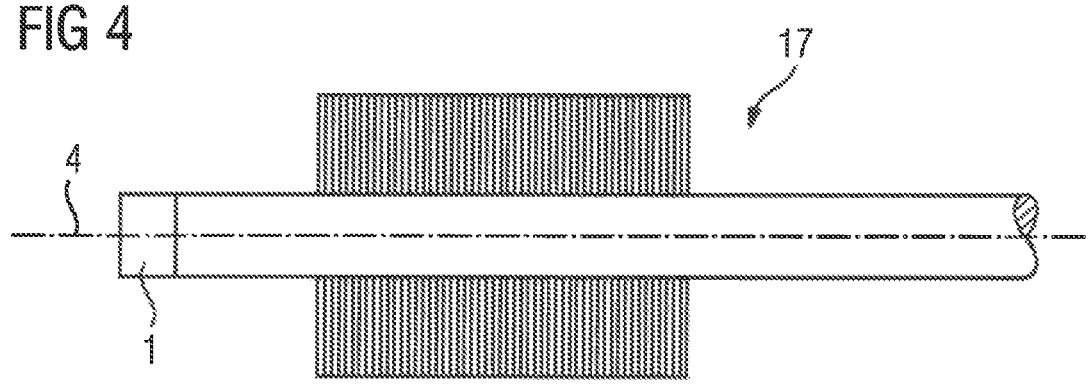
FIG. 4 shows a rotor of an electric machine.

In particular, according to the representation in FIG. 4, the complex ring element 1 of the present invention can be a component of a rotor 17 of an electric machine. In particular, one of the two rings 2, 3 can be the shaft of the rotor 17 or can be connected thereto.

In summary, the present invention therefore relates to the following subject matter.

A complex ring element 1 has a first and a second ring 2, 3 with a respective axis. The first and the second ring 2, 3 are arranged such that their axes lie on a shared axis 4 and the first and the second ring 2, 3 are adjacent to one another when viewed in the direction of the shared axis 4. The complex ring element 1 has a connecting element 7, by way of which the first and the second ring 2, 3 are interconnected. The connecting element 7 consists of metal. In each case, it partially overlaps the first and the second ring 2, 3 on their respective outer peripheral surfaces 8, 9 when viewed in the direction of the shared axis 4. The connecting element 7 is circumferential when viewed in the peripheral direction about the shared axis 4 and is manufactured by means of an additive application method.

The present invention has many advantages. In particular, an extremely stable connection between the two rings 2, 3 of the complex ring element 1 can be established in a simple, reliable and cost-effective manner. For the most part, only axial forces and torsion forces occur between the rings 2, 3 and the connecting element 7. Uneven compressive forces and bending stresses are almost entirely avoided. Forming tools are not required to establish the connection between the two rings 2, 3. Particularity if one of the two rings 2, 3 consists of steel and one of ceramic, then the advantages of both materials can be used.

Although the invention has been illustrated and described in greater detail with the preferred exemplary embodiment, the invention is not restricted by the examples disclosed and other variations can be derived therefrom by the person skilled in the art without departing from the protective scope of the invention.

What is claimed is:

1. A complex ring element, comprising:

first and second rings arranged such that their axes lie on a shared axis and disposed adjacent to one another when viewed in the direction of the shared axis, with one of the first and second rings representing a shaft of a rotor or being connected to a shaft of the rotor, said first ring being made of metal and said second ring being made of ceramic; and an additively applied connecting element made of metal for interconnecting the first and the second rings, with the connecting element having an inward-facing first circumferential projection and partially overlapping an outer peripheral surface of the first ring and being connected to the first ring with a material fit, and partially overlapping an outer peripheral surface of the second ring and having an inward-facing second circumferential projection and being connected to the second ring with a positive or non-positive fit, said connecting element configured to extend circumferentially when viewed in the peripheral direction about the shared axis, wherein the first ring has on its outer peripheral surface a first circumferential recess engaging with the first circumferential projection and a first contour configured to exert a resistance to counteract a twisting of the connecting element about the shared axis in relation to the first ring, with a torque being transferable between the first ring and the connecting element;

wherein the second ring has on its outer peripheral surface a second circumferential recess engaging with the second circumferential projection and a second contour configured to exert a resistance to counteract a twisting of the connecting element about the shared axis in relation to the second ring, with a torque being transferable between the second ring and the connecting element; and wherein the first contour arranged on the outer peripheral surface of the first ring and the second contour arranged on the outer peripheral surface of the second ring comprise elevations or depressions arranged so as to exclude ring-like structures that extend solely circumferentially about the shared axis.

2. The complex ring element of claim 1, wherein the connecting element is additively applied by cold gas spraying.

3. The complex ring element of claim 1, wherein the first ring is made of steel.

4. The complex ring element of claim 1, wherein the complex ring element is configured for use as a component of a rotor of an electric machine.

5. The complex ring element of claim 1, wherein the elevations or depressions are tooth-shaped and extend axially along the shared axis.

* * * * *

UNITED STATES PATENT AND TRADEMARK OFFICE
CERTIFICATE OF CORRECTION

| | |
|---|---|
| PATENT NO. | : 12,181,002 B2 |
| APPLICATION NO. | : 17/431652 |
| DATED | : December 31, 2024 |
| INVENTOR(S) | : Reiner Seufert and Rolf Vollmer |

Page 1 of 1

It is certified that error appears in the above-identified patent and that said Letters Patent is hereby corrected as shown below:

On the Title Page

On the second page, Column 2, Line 5, under FOREIGN PATENT DOCUMENTS:
Replace "DE 10 2016 224 947 A1" with --DE 10 2015 224 947 A1--.

Signed and Sealed this
Eleventh Day of February, 2025

Coke Morgan Stewart
*Acting Director of the United States Patent and Trademark Office*